United States Patent

[11] 3,560,775

| [72] | Inventor | Otto Welter |
| --- | --- | --- |
| | | Orselina-Logarno, Switzerland |
| [21] | Appl. No. | 533,329 |
| [22] | Filed | Mar. 10, 1966 |
| [45] | Patented | Feb. 2, 1971 |
| [73] | Assignee | Elektro-Motoren A.G. |
| | | Zug, Switzerland |
| [32] | Priority | Mar. 10, 1965 |
| [33] | | Germany |
| [31] | | E28,846 |

[54] ROTARY MAGNETOELECTRIC DEVICE
17 Claims, 7 Drawing Figs.

[52] U.S. Cl. .................................................. 310/126,
310/156, 310/254
[51] Int. Cl. .................................................... H02k 21/10
[50] Field of Search ......................................... 310/266,
12—15, 17, 20, 23, 27, 40(MM), 46, 114, 126,
152, 156, 162—165, 216, 218, 254, 257

[56] References Cited
UNITED STATES PATENTS

| 2,212,192 | 8/1940 | Howell | 310/156 |
| --- | --- | --- | --- |
| 3,164,735 | 1/1965 | Lichowsky | 310/156 |
| 3,256,453 | 6/1966 | Haydon | 310/156 |
| 2,251,816 | 8/1941 | Arutunoff | 310/87 |
| 2,726,344 | 12/1955 | Neuenschwander | 310/172 |
| 3,265,911 | 8/1966 | Madsen | 310/12 |
| 3,394,295 | 7/1968 | Cory | 310/156 |
| 2,860,267 | 11/1958 | Hayes | 310/266 |
| 2,974,242 | 3/1961 | Apstein | 310/266 |
| 3,312,846 | 4/1967 | Henry-Baudot | 310/266 |
| 3,356,877 | 12/1967 | Burr | 310/266 |

*Primary Examiner*—D. F. Duggan
*Attorney*—Otto John Munz

ABSTRACT: A rotary magnetoelectric device of small diameter and great length having a stator assembly comprising at least two pairs of U-shaped members. The outer legs of the U-shaped members are in abutment whereas the inner legs are spaced to provide a central air gap, thus forming at least two pairs of stator poles. A cylindrical permanent magnet rotor is disposed between the stator poles. A cylindrical coil provides an alternating field to the stator poles.

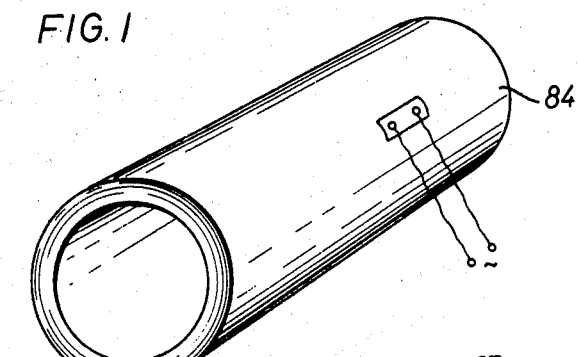
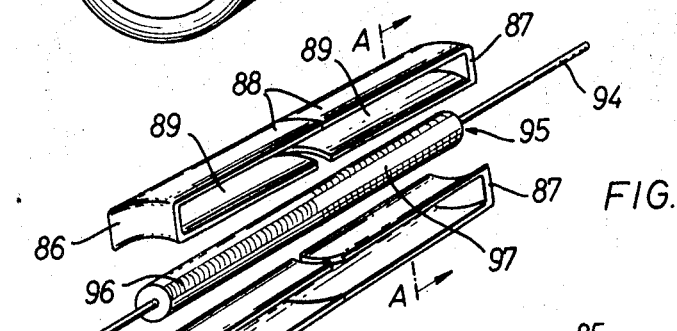
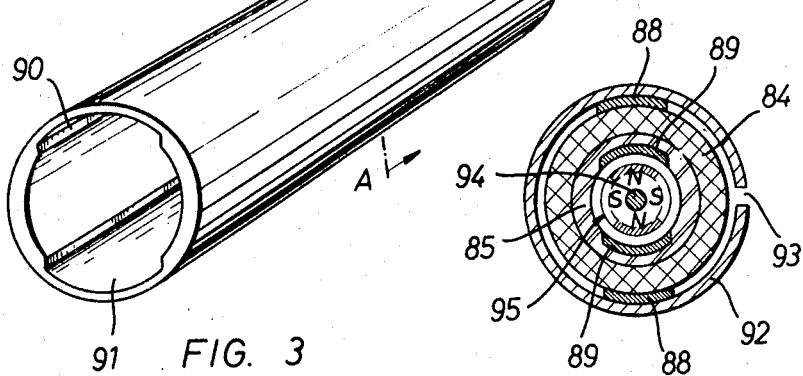
INVENTOR
Otto Welter

INVENTOR
Otto Welter

ROTARY MAGNETOELECTRIC DEVICE

BACKGROUND OF THE INVENTION

Field of the Invention

The invention relates to rotary magnetoelectric devices, and in particular to rotary devices such as motors and generators, including rotary oscillator devices.

Devices for transforming electrical energy into mechanical energy, and vice versa, by means of magnetic field forces, are known in many forms and for many purposes, for example, as motors, generators, measurement and parameter converters and the like. Such devices generally comprise a stationary member and a movable member, one of which includes a permanent magnet, the members being spaced from each other by a narrow air gap, and movable relative to each other under the influence of an alternating magnetic field in said gap.

In the field of automation in particular, there is an increasing need for devices of this kind, in which the movable member is capable of faithfully following changes in the electrical input, even at comparatively high frequencies. This requirement is very difficult to fulfill with known devices, because in conventional devices the mass of the movable member and the inertia forces resulting therefrom are disproportionately great compared with the magnetic field forces normally obtainable. The stator assembly of prior devices typically includes a laminated block formed of a plurality of flat strips of paramagnetic material. Such laminated stator blocks are heavy, bulky and expensive.

SUMMARY OF THE INVENTION

It is an objective of the present invention to provide a magnetoelectric device which is simple and economical to produce and which is capable of faithfully following changes in the input signal.

According to the present invention the above objective is attained with a rotary magnetoelectric device where the stator assembly comprises at least two pairs of U-shaped members the outer legs of which are in abutment and the inner legs of which are spaced to provide a central air gap for the device, the inner legs thereby forming the stator poles. The movable member is a cylindrical permanent magnet rotor disposed intermediate said stator poles and spaced therefrom by a narrow air gap. The stator assembly has a cylindrical coil adapted to provide an alternating field to said stator poles.

The structure of the stator assembly according to the invention is easy to manufacture and very advantageous with regard to space requirements in relation to the magnetic flux (gauss's times cm.$^2$, or maxwells; 1 gauss = 1 maxwell per cm.$^2$) in the narrow air gap between the stator poles and the permanent magnetic rotor. The operating current may be periodic or aperiodic and may be of sine or rectangular waveform. A device constructed according to the invention can be also arranged to operate as a rotary oscillator and such devices can be operated at frequencies in the ultrasonic range and higher. The input power requirements can lie between the fractions of watt and several hundred watts, depending upon the proposed use. A device constructed according to the invention is particularly suitable in applications in which the movable body is subjected to high accelerations, or decelerations or sudden changes of direction, and where a high starting torque is required.

The inertia of a cylindrical rotor with circular cross section and diameter $d$ is proportional to the fourth power of $d$. Therefore it is advantageous for the purpose of the present invention to use a rotor with small diameter $d$. On the other hand the torque caused by the magnetic field acting upon a rotor of small diameter will be proportionally smaller than the torque acting upon a rotor of greater diameter under otherwise equal conditions. The inertia and the torque are both nearly proportional to the length of the rotor. Experiments prove that the ratio inertia to torque increases essentially with increasing diameter of the rotor under otherwise equal conditions. For this reason the magnetoelectric device according to the invention is very advantageous because it can be easily manufactured with a rotor of small diameter the length of which may be 5 or even 10 times as great as the diameter. It is therefore another object of the present invention to provide a magnetoelectric device where the length of the rotor is at least 5 times greater, preferably 10 times greater, than its diameter.

In a preferred embodiment of the present invention the permanent magnet rotor is divided magnetically into two length portions. Each of the rotor portions has a magnetic pattern with a succession of circumferentially arranged pairs of magnetic poles, the pole-pairs of each rotor portion being circumferentially offset from the pole-pairs of the other rotor portion by the width of one pole.

The novel features which characterize the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a coil of a magnetoelectric device representing a first embodiment of the invention;

FIG. 2 illustrates diagrammatically and perspectively the pole pieces used in conjunction with the coil of FIG. 1 and a permanent magnet rotor;

FIG. 3 shows an insulating tube serving as a coil former for the coil of FIG. 1;

FIG. 4 is a cross section through a magnetoelectric device constructed from the elements illustrated in FIGS. 1 to 3;

DESCRIPTION OF THE PREFERRED EMBODIMENTS

Figure 5:
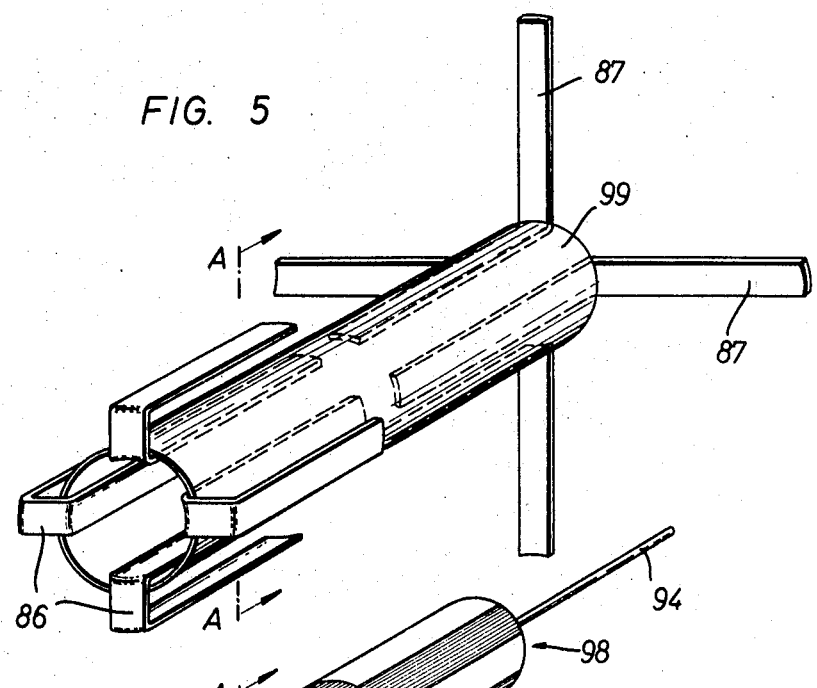
FIG. 5 illustrates a coil former tube and pole pieces of a second embodiment of the invention.

In the embodiment of the magnetoelectric device illustrated in FIGS. 1 to 4 a multilayer cylindrical coil 84 (FIG. 1) is supported by an insulating tube 85 (FIG. 3). The coil 84 may be energized by single-phase alternating current and is arranged to magnetize two pairs of U-shaped members 86 and 87. The outer and inner legs 88 and 89 of the respective members 86, 87 are of different lengths, so that, after the members have been pushed onto the assembled coil 84 and insulating tube 85, the opposed end faces of the legs 88 of the two pairs of members lying along the outer surface of coil 84 meet in close and intimate abutting relation, while the opposed end faces of the legs 89 of each pair of U-shaped members embedded in the grooves 90, 91 (mutually oppositely disposed in the insulating tube 85) are spaced from each other by at least the thickness of the U-shaped member thus forming a pair of stator poles. The magnetic return path is provided by a cylindrical tube 92 surrounding and contacting with the lowest possible magnetic resistance the outer legs 88 of the U-shaped members. The tube 92 is formed with a longitudinal slot 93 and is thus prevented from acting as a magnetic short circuit.

A cylindrical permanent magnet 95 is mounted on a shaft 94 and is subdivided magnetically into two rotor portions 96 and 97. The two rotor portions are generally of approximately equal length and radially magnetized in a quadripole magnetic pattern as illustrated in FIG. 4, and by the shaded portions in FIG. 2. As can be seen from FIG. 2, the set of pole-pairs in the rotor portion 96 is offset by 90° from the set of pole-pairs in the rotor portion 97. The shaft 94 is carried in bearings (not shown) which center the magnetic rotor with respect to the legs 89 of the U-shaped members spaced therefrom by a narrow gap.

Figure 6:
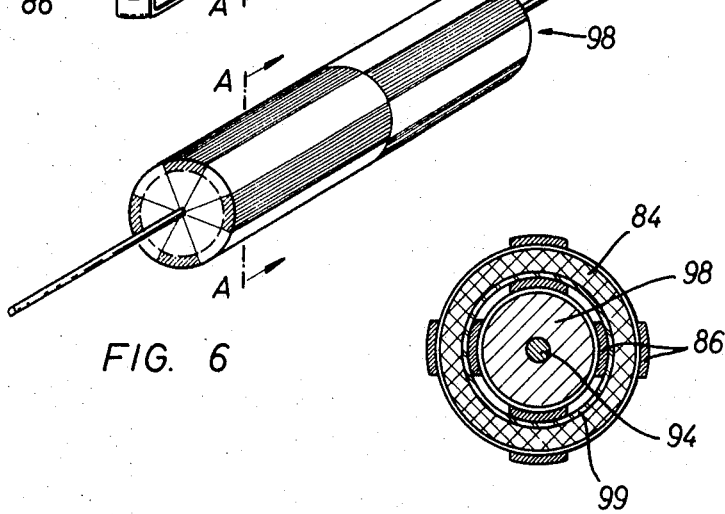
FIG. 6 illustrates a permanent magnet rotor for this second embodiment.
Figure 7:
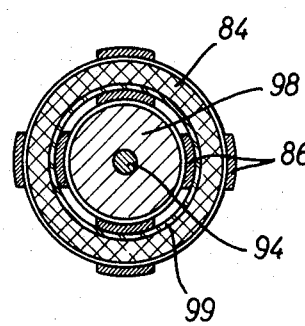
FIG. 7 is a cross section through a magnetoelectric device constructed from the elements of FIGS. 5 and 6.

The magnetoelectric device corresponding to FIGS. 5 to 7 differs from the earlier described embodiment by the arrangement of four pairs of U-shaped members 86 and 87 around the coil of the stator assembly and by the rotor 98 which is magnetized to form four perpendicularly arranged pole-pairs (instead of two pairs). The two sets of pole-pairs are circumferentially offset from each other by 45°, i.e. by the width of one of the poles.

It may be advantageous to bend the pole shoes only after the cylindrical coil 84 has been pushed over the insulating cylinder 99, or after it has been wound directly around this cylinder. An appropriate method is shown diagrammatically in the right-hand portion of FIG. 5, wherein the coil 84 has been omitted for the sake of clarity. The stator pole members 86 and 87 are preferably stamped from magnetic sheet. These stampings may be curved to cooperate with the rotor 95, 98 as shown in FIGS. 2, 4, 5, and 7 and with the yoke 92 as shown in FIG. 4.

The ratio of the length of the rotors 95 and 98 to their diameter is at least equal to 5 and preferably greater than 10. In FIGS. 1, 2 3, 5, and 6, the longitudinal dimensions of the rotors and stators are shown shortened with respect to their diameters for the sake of clarity only.

A particularly high degree of efficiency is obtained if the permanent magnet of the rotor is made from metallic Alnico of Cunife (copper-iron-nickel) magnetic alloys which, although they are comparatively heavy (having a specific gravity of approximately 7gr/cm$^3$), are capable of being very strongly magnetized.

In order to obtain a better distribution of the magnetic field, when rotors having more than two poles are used, it has been found to be preferable to use cylindrical rotors of star-shaped or polygonal cross section having more or less pronounced poles, instead of a uniform circular cross section. Rotors of such star-shaped or polygonal cross section have a reduced weight and inertia.

Particularly rapid starting and stopping is obtainable if the rotor is made from a ferrite whose specific gravity is only half the value mentioned above, i.e. approximately 3.5 gr/cm$^3$. The pronounced poles mentioned above are not required, when the rotors are made from ferrite. The rotor will rotate in either direction. However, if required, known means may be provided to set the direction of rotation or to change the direction during operation.

In practice it has been found that devices of the type shown in FIGS. 1 to 7 are easily manufactured having an external diameter of only 5 to 10 mm.

It should be understood that the present disclosure is for the purpose of illustration only and that this invention includes all modifications and equivalents which fall within the scope of the appended claims.

I claim:

1. A rotary magnetoelectric device comprising in combination:
    a stator assembly and a rotor;
    the stator assembly including at least one pair of poles, each pole-pair being part of an equal number of pairs of longitudinally aligned U-shaped members, the outer legs of which are in abutment, while the inner legs forming the poles are spaced to provide an axial air gap centrally of the device;
    the rotor being a permanent magnet rotor positioned for rotary motion between said stator poles and spaced therefrom by a narrow radial air gap;
    the device further including a coil adapted to create, and interact with, an alternating magnetic field on said stator poles.

2. A device in accordance with claim 1, wherein said stator pole members comprise magnetic sheet metal stampings.

3. A device in accordance with claim 1, wherein said stator poles are curved to cooperate with said rotor.

4. A device in accordance with claim 1, wherein the ratio of the length to the diameter of the rotor is at least 5.

5. A device in accordance with claim 1, wherein the ratio of the length to the diameter of the rotor is at least 10.

6. A device in accordance with claim 1, wherein the rotor is cylindrical, having at least two radially magnetized poles.

7. A device in accordance with claim 1, wherein the rotor has a profile derived from a cylinder, having at least two radially magnetized poles, with peripheral profile portions between the poles removed from the cylinder to reduce its rotary inertia.

8. A device in accordance with claim 1, wherein said stator assembly includes at least two pairs of poles.

9. A device in accordance with claim 8, wherein said rotor is subdivided magnetically into two length portions, each rotor portion being radially magnetized to form a magnetic pattern in the form of a succession of circumferential pole-pairs equal in number with the number of pole-pairs in the stator assembly, the pole-pairs of one rotor portion being circumferentially offset from the pole-pairs of the other rotor portion.

10. A device in accordance with claim 9, wherein the circumferential offset between the pole-pairs of the two rotor portions equals the circumferential width of one pole.

11. A device in accordance with claim 1, wherein said coil surrounds an insulating tube.

12. A device in accordance with claim 1, wherein said insulating tube is provided with inside grooves equal in number to the stator poles.

13. A device in accordance with claim 1, wherein said grooves receive said inner legs of said U-shaped stator pole members.

14. A device in accordance with claim 1, wherein said coil is a cylindrical multilayer coil.

15. A device in accordance with claim 1, wherein said coil is cylindrical and positioned radially between said inner and outer legs of the U-shaped members.

16. A device in accordance with claim 1, further comprising an outer metal cylinder surrounding the outer legs of said U-shaped member so as to form a magnetic yoke.

17. A device in accordance with claim 16, wherein said coil is between said inner and outer legs of said U-shaped stator pole members.